the procedures more particularly described hereinafter.

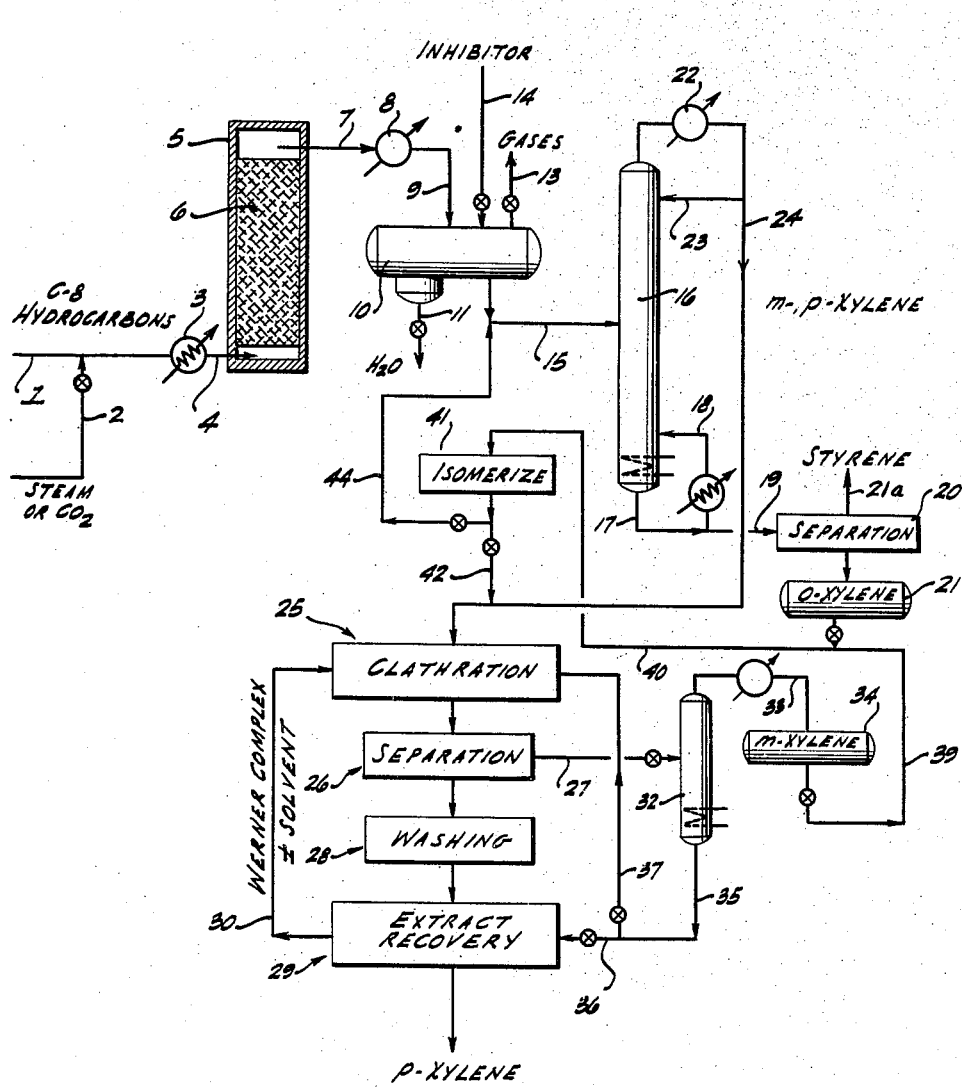

United States Patent Office

2,951,104
Patented Aug. 30, 1960

2,951,104

SEPARATION OF C-8 AROMATIC HYDROCARBON ISOMERS USING WERNER COMPLEXES

William D. Schaeffer, Ontario, and John D. Wordie, Fullerton, Calif., assignors to Union Oil Company of California, Los Angeles, Calif., a corporation of California Filed Aug. 27, 1953, Ser. No. 376,792

6 Claims. (Cl. 260—669)

This invention relates to methods for separating mixtures of the C-8 aromatic hydrocarbon isomers, i.e. o-, m- and p-xylenes and ethylbenzene. It relates particularly to the recovery and synthesis of pure p-xylene from mixtures which also contain substantial proportions of ethylbenzene and at least one, and preferably both, of the isomers o-xylene and m-xylene. Such hydrocarbon mixtures commonly result from the hydroforming or reforming of naphthenic gasoline fractions. The method contemplated herein consists essentially in a two-stage process wherein such feed mixtures are treated in a first stage to remove ethylbenzene and preferably o-xylene, thereby rendering the feed mixture particularly amenable to the second stage of the process wherein the p-xylene is separated from m-xylene by selective clathration with a solid Werner complex. The selectively absorbed or "clathrated" p-xylene is then recovered from the solid clathrate by any of several procedures hereinafter described.

The present invention is based upon the basic discovery that the clathration process for separating the C-8 hydrocarbons, employing solid Werner complexes as clathrate formers, is greatly improved in efficiency if the feed mixture is essentially free of ethylbenzene. The solid Werner complexes described hereinafter are capable of forming solid clathrates selectively with p-xylene, and to a lesser extent with ethylbenzene, while o- and m-xylenes are hardly clathrated at all under the conditions described herein. By removing ethylbenzee from the feed mixtures the efficiency, in terms of pounds of p-xylene clathrated per pound of Werner complex, is considerably increased, irrespective of the ratio of complex to p-xylene in the feed mixture. Moreover the purity of the p-xylene recovered from a single stage of clathration is greatly improved. Other process advantages result from the over-all diminishing of the volume of feed mixture which goes to the clathrating step.

While any method for removing ethylbenzene before clathration will enhance the efficiency of that step, the method herein preferred is found to result in still other advantageous features. This particular method consists in catalytically dehydrogenating the feed mixture whereby the ethylbenzene is converted almost quantitatively to styrene, while the xylenes pass through essentially unchanged. The resulting mixture may then be treated, as by solvent extraction or extractive distillation, to separate the styrene from the xylenes. It is preferable however to take advantage of the peculiar redistribution of boiling points brought about the dehydrogenation to remove both o-xylene and styrene from the product, leaving essentially only m- and p-xylene to be treated by clathration. The feasibility of this operation may be appreciated from a consideration of the boiling points:

|          | ° C.    |
|----------|---------|
| p-Xylene | 138.35  |
| m-Xylene | 139.1   |
| o-Xylene | 144.4   |
| Styrene  | 146     |

It will be seen that ethylbenzene, originally the lowest boiling component (B.P. 136.1° C.), is transformed to styrene, the highest boiling component. By fractionating this mixture in an efficient column, it is possible to separate styrene plus o-xylene as bottoms, while taking m- and p-xylene overhead. The latter two materials are the components which are most effectively separated by clathration, and least effectively separated by distillation. The styrene-o-xylene fraction may then be resolved into its components by any suitable method such as extractive distillation or solvent extraction, etc. By eliminating the ethylbenzene and o-xylene the volume of feed mixture to the clathration step is ordinarily diminished by about 30–40%, thereby effecting further economies in the volume of solvent or thinner employed in that step.

When ethylbenzene-containing feed stocks are directly clathrated, part of the ethylbenzene is clathrated along with the p-xylene, and a substantial part still remains in the unclathrated, or raffinate xylenes. This hinders the effective utilization of the raffinate; the ratio of p-xylene to ethylbenzene therein is usually too small to permit effective recovery by re-clathration, and the mixture is not well suited for conversion to p-xylene by isomerization because the ethylbenzene causes extensive disproportion to occur as exemplified by the equations:

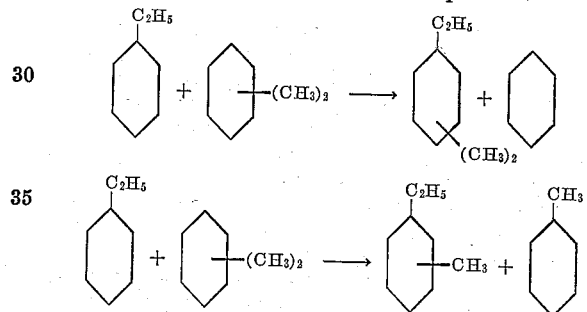

By removing ethylbenzene, the clathration raffinate may be effectively re-clathrated, or may be equilibrated by isomerization to form the equilibrium proportion of p-xylene with little or no formation of ethylbenzene.

The use of ethylbenzene-free feeds is advantageous in the clathration procedure wherein the solid Werner complex is contacted with the feed mixture in the presence of an extraneous hydrocarbon thinner. It is also advantageous in the alternative clathration procedure wherein a solvent such as ethylene glycol is employed. In both cases it decreases the volume of solvent or thinner required, as well as the quantity of Werner complex per pound of feed mixture.

In view of the above discussion it will be apparent that one of the primary objects of this invention is to improve the efficiency of solid Werner complexes for resolving C-8 aromatic hydrocarbons by selective clathration of p-xylene. Another object is to provide a method for removing ethylbenzene which is particularly well adpted to the clathration process in that it also permits the concomitant removal of o-xylene. Another object is to provide methods whereby the clathration raffinate may be effectively isomerized to form additional p-xylene. Still another object is to provide effective means for separating styrene from m- and p-xylene by distillation without causing polymerization of the styrene. Another object is to provide methods whereby each of the C-8 aromatics may be recovered in substantially pure form and in high yields. A still further object is to remove ethylbenzene by converting it to a valuable by-product without the need of first separating ethylbenzene from the xylenes. These and other objects are achieved by the procedures more particularly described hereinafter.

In the reforming or hydroforming of naphthenic gasoline fractions, an aromatic reformate fraction may be obtained which boils between about 135°–145° C., and consists essentially of the C-8 aromatics in about the following molar proportions:

| | Percent |
|---|---|
| p-Xylene | 15–25 |
| m-Xylene | 40–60 |
| o-Xylene | 15–25 |
| Ethylbenzene | 10–20 |

The methods described herein are particularly adapted for the recovery of substantially pure p-xylene in high yields from such mixtures. Previous methods for resolving such fractions are unsatisfactory from several standpoints. Fractional distillation may be feasible for separating o-xylene, or an ethylbenzene concentrate, but is ineffective for obtaining pure p-xylene due to the proximity of boiling points. Fractional crystallization is complicated by the formation of binary and ternary eutectics, so that even though p-xylene melts at 13.2° C. while m-xylene, o-xylene and ethylbenzene melt at −53.5° C., −29° C., and −94° C. respectively, pure p-xylene may not be obtained from such mixtures except in low yields by repeated fractional crystallizations. Other separation methods have been proposed such as selective sulfonation, but such chemical methods are inherently cumbersome and expensive.

It has recently been discovered that p-xylene, and to a lesser extent ethylbenzene, may be selectively absorbed or "clathrated" into certain Werner complexes composed of a metal salt and an organic nitrogen base, while m- and o-xylene are strongly rejected by such complexes. By using this process a p-xylene-ethylbenzene-rich extract may be separated from mixtures which also contain m-xylene and o-xylene. Although the Werner complexes employed are more selective for p-xylene than for ethylbenzene, it is found that the clathration reaction is essentially an equilibrium phenomena, and the clathrated phase, or extract, usually contains a ratio of p-xylene-to-ethylbenzene of about 3 to 4 times that of the feed mixture. Complete separation of p-xylene from ethylbenzene is therefore not practicable by clathration alone, employing clathrate formers which have a substantial affinity for ethylbenzene, unless a large number of stages is employed. Moreover, the higher the ratio of ethylbenzene to p-xylene in the feed mixture, the lower will be the efficiency of the clathration step in terms of pounds of clathrate former required per pound of p-xylene recovered from any single clathration stage.

While as indicated above, any method for removing ethylbenzene would be highly beneficial, the specific dehydrogenation process contemplated herein is especially advantageous in that, with feed mixtures which contain not more than about 20% ethylbenzene, substantially 100% conversion thereof to styrene may be obtained employing dehydrogenation conditions which are known in the art i.e. temperatures from about 575° to 700° C., and preferably between 600° and 650° C., and pressures between about 0 and 500 p.s.i.g., or higher. A variety of catalysts may be employed such for example as zinc oxide, chromium oxide, iron oxide, magnesium oxide, activated charcoal, activated aluminas, bauxites, etc. Combinations of these materials with other components may also be employed such for example as copper-chromia, cobalt-molybdena, chromia-molybdena, etc. These materials may be employed in substantially pure powdered form, or pelleted in tablet form, or they may be impregnated on carrier materials such as alumina, bauxite, clays, etc. In general any of the well known hydrogenation-dehydrogenation catalysts may be emtployed, which are generally oxides, sulfides, or finely divided metallic forms of the metals from groups VIB and VIII of the periodic table.

Although in the dehydrogenation step the xylenes function as an inert diluent lowering the partial pressure of styrene, and thereby increasing the yield, it may be desirable to add further quantities of inert gases such as $H_2O$, $CO_2$, $N_2$, etc. Generally between about 1 and 4 moles of such gases per mole of feed mixture may be employed. The feed rate of hydrocarbons may vary considerably but good results are obtained at space velocities of between about 0.1 and 5.0 volumes, and preferably between 0.3 and 0.8 volumes of liquid feed per volume of catalyst per hour. Under the conditions herein described the catalyst retains its activity for long periods of time, up to a year or more. However in case it should become contaminated it may be periodically regenerated in a stream of air at for example 500° to 600° C.

The details of the process may perhaps be better understood by referring to the accompanying drawing which is a schematic flowsheet illustrating some of the specific modifications which may be employed.

The vaporized feed mixture of C-8 aromatic hydrocarbons is brought in through line 1 and admixed with a suitable proportion of diluent gas such as steam or carbon dioxide admitted through line 2. The mixed gases are then heated to the reaction temperature in heater 3 and passed through line 4 into dehydrogenation reactor 5 which is packed with a catalyst 6. The hot gases pass upwardly under the conditions described above, the inert gases and non-reactive hydrocarbons supplying the endothermic heat requirements. After a suitable contact time as indicated above, the reaction gases are removed through line 7, condensed in heat exchanger 8, and passed through line 9 into surge tank 10. Any condensed water is removed through line 11, and the fixed gases such as $H_2$, $CO_2$, $N_2$, etc. are released through line 13. The hydrocarbons accumulating in vessel 10 will contain about 10–20 volume percent of styrene. To condition the mixture for subsequent distillation a suitable quantity of polymerization inhibitor such as elemental sulfur or p-tert-butyl catechol may be admitted through line 14.

The inhibited hydrocarbon mixture is then drawn off through line 15 and transferred to distillation column 16. To effect the desired separation of styrene plus o-xylene as bottoms from m- and p-xylene as overhead, column 16 should contain at least about 70–80 actual plates, and it should be operated at low temperatures and pressures to avoid polymerization. The bottoms temperature in column 16 should not be allowed to exceed about 120° C. and should preferably range between about 90° and 110° C. Vacuum jets and cooling water may be employed to keep the top of the column at the desired pressure, e.g. between about 30 and 75 mm. Hg. It should be noted that the presence of o-xylene in the bottom of the column permits a higher bottoms temperature than can be safely employed when pure styrene is present in the bottom of a column, even though inhibitors are present. With pure styrene as bottoms, such a column would need to be maintained at not more than about 90° C. in order to prevent polymerization.

The bottoms from column 16 is drawn off through line 17 and a portion thereof may be recycled through line 18 as bottoms reflux. The net bottoms is transferred through line 19 to a separation step indicated generally at 20, wherein o-xylene is recovered and sent to storage tank 21, while styrene is taken off through line 21a. The separation of styrene and o-xylene is not feasible by distillation. However many other suitable methods may be employed which form no essential part of the present invention. For example they may be separated by solvent extraction with various solvents such as ethylene glycol, water-ethanol, or they may be separated by extractive distillation.

The overhead from column 16 is condensed in heat exchanger 22, and a part thereof is returned through line 23 as reflux. The net overhead, now consisting essentially of m- and p-xylene, with traces only of o-xylene and ethylbenzene, is transferred via line 24 to the clathration step indicated generally at 25. This step involves essentially a contacting of the feed mixture with the particular Werner complex which is to be employed by either of two general methods. The first consists in merely contacting and agitating a solid Werner complex with the liquid feed mixture. In this method, it may be desirable to dilute the feed mixture with a thinner which is not a solvent for the Werner complex in order to facilitate the agitation and handleability of the mixture. Hydrocarbon thinners are preferred for this purpose. In other cases the feed mixture may be sufficiently lean in p-xylene that an extraneous thinner is unnecessary. In either case it is desirable that sufficient fluid be present to form a slurry which may be easily stirred, as with a propeller, or in a colloid mill. If no thinner is employed, the solid clathrate which is filtered or otherwise separated from the lean feed residue will contain an interstitial phase composed primarily of lean feed residue. If a thinner is employed, the interstitial phase will consist of thinner plus lean feed residue.

The second general method for performing the clathration step consists in dissolving a Werner complex in a solvent such as propylene glycol, methyl Cellosolve, or chloroform, adding and dissolving the feed mixture, and then altering the physical environment of the whole mixture, as by cooling, in such manner as to precipitate the Werner complex. In precipitating, the complex selectively absorbs p-xylene, thereby forming a solid clathrate. As recovered by filtration or centrifuging, the clathrate contains an interstitial phase consisting of solvent plus lean feed mixture.

The separation step indicated at 26 may be performed in any suitable manner, as by filtration, centrifuging, decantation, or by liquid-liquid phase separation wherein the solid clathrate is either suspended or dissolved in one of the phases. In any case, the raffinate is taken off through line 27 to be treated as described hereinbelow, and the solid clathrate is transferred to the washing step 28.

The clathrate from the separation step 26 contains an absorbed phase, or extract, relatively rich in p-xylene. As indicated above, it also contains an interstitial phase composed of solvent, thinner, or lean feed residue. The washing step 28 is designed primarily for removing the interstitial phase. This step may be omitted if desired, but to obtain maximum purity, i.e. to reduce the ortho- and meta-xylene content of the recovered extract to a minimum, it is preferable to remove the interstitial phase before recovering the extract. The washing step is intended to include broadly any method for removing the interstitial phase. Such methods include for example steam-stripping, vapor-stripping, or washing with a solvent which is more readily separable from the clathrated phase than was the original interstitial phase. Suitable solvents include for example paraffinic hydrocarbon fractions in the pentane to heptane range.

The washed clathrate is then subjected to treatment for recovery of the clathrated phase, or "extract" in recovery step indicated at 29. Several methods may be employed for recovering the extract. One method consists of steam or vapor-stripping. The extract may also be recovered by simply destroying the Werner complex, as by treatment with acid. It is ordinarily preferable however to recover the complex in a form suitable for recycling to the clathration step 25. Another method for recovering the extract consists in dissolving the clathrate in a solvent, preferably a high-boiling solvent such as ethylene glycol, diethylene glycol, methyl Cellosolve, butyl Cellosolve, propylene glycol, butylene glycol, glycerol ethers, etc., and then distilling the solution to recover the liberated xylenes. In this process the p-xylene may be recovered in substantially pure form, or as an azeotrope with the solvent. After recovery of the p-xylene the solid complex may be recovered by cooling the solvent. In most cases additional feed mixture may be added before the complex is precipitated, thereby again forming a clathrate with the para-xylene. In any case, the stripped complex, either in solid form or dissolved in a solvent, is recycled via line 30 to the clathration step 25. Any other suitable method for recovering the extract from the clathrate may be employed. The p-xylene recovered may be again subjected to clathration for greater purity, and two clathration stages ordinarily will yield 97–100% pure p-xylene, whereas if ethylbenzene is present in the feed mixture, 3 or 4 stages may be required to get the same purity.

The raffinate which is removed from separation step 26 through line 27 consists essentially of m-xylene together with small amounts of p-xylene and o-xylene together with either a solvent or a hydrocarbon thinner, depending upon which of those materials was used in the clathration step. This mixture is then separated as by fractionation in a distillation column 32. A m-xylene-rich overhead is taken off through line 33 and transferred to a storage tank 34, part of which may be advantageously utilized in the process by methods to be described hereinafter. The bottoms from column 32 is removed through line 35, and is essentially either hydrocarbon thinner or solvent. If it is a solvent it is preferably diverted at least in part through line 36 to the extract recovery step 29, in which case it is at a sufficiently high temperature to redissolve the clathrate from step 28. The p-xylene liberated by the dissolution of clathrate is then recovered as heretofore described. If the bottoms from column 32 consists of hydrocarbon thinner, it is preferably diverted through line 37 and recycled to clathration step 25.

The relatively pure m-xylene in storage tank 34 and the o-xylene in storage tank 21 may be utilized per se if there is sufficient demand for those materials. However, there is at present little commercial use for m-xylene and it is hence preferable to convert that material to p-xylene for which there is a considerably greater demand. The same is true to a lesser extent of o-xylene. For these reasons part or all of the m-xylene and o-xylene may be transferred via lines 39 and 40 to an isomerization step 41 wherein these materials are subjected to known isomerization conditions, and thereby converted in part to p-xylene.

It has been found that in the isomerization of xylenes, there is a distinct advantage in utilizing feed mixtures which are substantially free from ethylbenzene. It is well known that the ethyl group on the benzene nucleus is considerably more labile than the methyl groups. If ethylbenzene is present it is virtually impossible to selectively isomerize the xylenes intra-molecularly without causing considerable disproportionation, resulting in the production of benzene, toluene and C–9 hydrocarbons. However, utilizing an ethylbenzene-free feed, it has been found possible to form an equilibrium isomerizate without effecting any appreciable disproportionation. The conditions employed for obtaining such isomerization may be divided into two general categories. In the first category the feed mixture is contacted with a Friedel-Crafts type catalyst such as aluminum chloride or hydrogen fluoride. If aluminum chloride is employed a promoter is necessary such as water, hydrochloric acid, sodium chloride or hydrogen fluoride. The temperature for this reaction may range between about 75° and 200° C. and preferably between 100° and 150° C. The contact time may vary between about 10 minutes and 2 hours and preferably about 20 to 40 minutes. Alternatively, the isomerization may be carried out in vapor phase over solid contact catalysts such as silica, silica-alumina, acid treated clays, silica-zirconia, magnesia, thoria, boron oxide, etc. at temperatures between about 250° and 650° C. and preferably about 500° to 600° C. The space velocity may range between about 0.2 and 20 volumes of liquid feed per volume of catalyst per hour.

The isomerizate recovered from any of the above procedures may have approximately the following composition:

| | Percent |
|---|---|
| o-Xylene | 15–30 |
| m-Xylene | 35–65 |
| p-Xylene | 10–25 |

This isomerizate may be utilized according to either of two principal modifications. If there is no reason for excluding o-xylene from the clathration stage, the whole mixture may be recycled through line 42 to the clathration stage 25. In this case the non-clathrated raffinate which is collected in tank 34 will contain both m- and o-xylenes. This procedure slightly decreases the efficiency of the clathration stage and hence may not be preferred, especially if a pure m-xylene stream is desired for other purposes. According to the preferred method for utilizing the isomerizate, it is cycled at least in part through line 44 and line 15 to the primary fractionation column 16 wherein the o-xylene is separated along with styrene as previously described. This mode of operation is highly advantageous in that it results in diluting the bottoms fraction in column 16 with additional o-xylene, thereby decreasing the tendency of the styrene to polymerize during distillation. Preferably the o-xylene concentration in the lower part of the column should be at least about twice that of styrene. This permits column 16 to be operated at considerably higher temperatures than are permissible when the bottoms product is substantially pure styrene, thereby increasing the capacity of the column. It will be seen therefore that the difficult fractionation of styrene from xylenes is facilitated at the same time that the undesired o- and m-xylene streams are being continuously converted to p-xylene. It will be seen also that the fractionation column 16 is well adapted for the simultaneous fractionation of the xylene isomerizate and the dehydrogenation effluent in a manner which greatly improves the efficiency of the clathration process.

The Werner type complexes employed herein are made up of at least three components. The fundamental unit is a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium, mercury, and molybdenum. Aluminum may also be used in some instances. A preferred class of metals consists of those in groups VIIB and VIII, and especially those having atomic numbers of 25 to 28 inclusive.

The second component of the complex consists of one or more basic nitrogen compounds, which are bound to the central metal atom through coordinate bonds. The complexes are mainly of the tetra- and hexa-coordinate types, wherein the metal atom is combined with four or six molecules of the basic nitrogen compound to form a positive radical which is usually divalent. Examples of suitable nitrogen compounds are set forth hereinbelow.

The positive radical is in turn combined with a suitable negative radical, such for example as thiocyanate —SCN, isothiocyanate —NCS, azide —NNN, cyanate —OCN, isocyanate —NCO, cyanide —CN, sulfate =SO$_4$, nitrate —NO$_3$, nitro —NO$_2$, nitrite —ONO, chloride —Cl, bromide —Br, iodide —I, phosphate ≡PO$_4$. A group of negative radicals found to be particularly effective for the present purposes consists of the monovalent radicals thiocyanate, isothiocyanate, azide, cyanate, isocyanate and cyanide. However, any radical may be utilized which is capable of producing a crystalline complex with the above positive radical, which complex will exhibit the desired selectivity for p-xylene and ethylbenzene. Similar complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co., 1928. These references also describe general methods which may be employed for preparing the particular complexes employed herein.

The basic nitrogen compound employed in the complexes should preferably be a heterocyclic nitrogen base. An especially preferred class of such nitrogen bases consists of the 4-substituted pyridines, e.g. gamma-picoline, 4-ethyl-pyridine, 4-hydroxy-pyridine, 4-chloro-pyridine, 4-chloromethyl-pyridine, 4-amino-pyridine, etc.

It is clear from the above that the preferred complexes consist of the thiocyanates of metals having an atomic number of 25–28 inclusive coordinated with a 4-substituted pyridine. Further examples of such complexes are as follows:

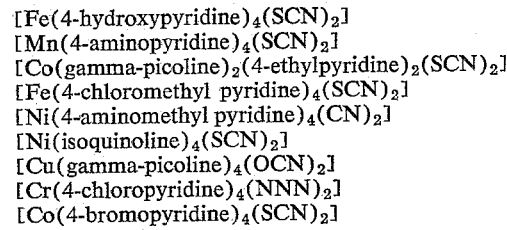

The amount of complex employed, relative to the feed mixture depends upon its specific capacity for absorbing p-xylene, and, also upon the proportion of p-xylene present in the mixture. The complexes are found in general to be capable of absorbing between about 5% and 50% by weight of p-xylene. Optimum efficiency may require that more or less than this stoichiometric amount of complex be employed, depending upon its relative capacity for m-xylene, and the number of clathration stages to be employed. In general, the ratio of complex may vary between about 0.25 and 20 parts by weight of complex per part of p-xylene in the mixture. Smaller proportions of complex will generally yield a purer extract, while larger proportions result in more complete removal of p-xylene, on the basis of a single stage batch clathration.

The following examples serve to illustrate specific conditions and results which may be obtained in the practice of this invention, but they should not be interpreted as limiting the scope thereof:

EXAMPLE I

A feed mixture having the composition shown in Table 1 is vaporized, admixed with 1 mole proportion of water vapor, and heated to about 650° C. The hot mixture is then passed continuously at the rate of 0.6 volume of liquid hydrocarbons per volume of catalyst per hour through a bed of copper-chromia catalyst contained in an insulated reactor. The effluent is then condensed to separate water and fixed gases. The hydrocarbon phase is saturated with elemental sulfur and passed continuously, in admixture with a xylene isomerizate obtained as hereinafter set forth, to a 90 plate fractionating column operated under reduced pressure at a bottoms temperature of about 110° C., and an overhead reflux ratio of 10/1. The bottoms product is treated by glycol extraction to separate o-xylene and styrene. The condensed overhead is subjected to clathration with 2.1 mole proportions, based on p-xylene, of the Werner complex prepared by adding 4 moles of gamma-picoline to one mole of nickel dithiocyanate in aqueous solution, which complex may be designated as [Ni(gamma-picoline)$_4$(SCN)$_2$]. Clathration is accomplished by grinding and agitating the solid complex at room temperature for two hours with the xylene mixture in the presence of about an equal volume of kerosene thinner and about 20% by weight of excess gamma-picoline, based on the weight of complex. The resulting solid clathrate is separated from the raffinate by filtration, and the raffinate is distilled to separate kerosene thinner from a m-xylene-rich overhead. The m-xylene overhead is then mixed with the above o-xylene fraction, and the mixture is isomerized by contacting for about 30 minutes with aluminum chloride containing about 2% HCl at about 120° C. The isomerizate is separated from the catalyst and distilled in the same column, along with the dehydrogenation effluent, as described above. In a continuous process under these conditions, the following approximate materials balance prevails at equilibrium:

Table 1

|  | Pounds per hour of— | | | | | |
| --- | --- | --- | --- | --- | --- | --- |
|  | p-xylene | m-xylene | o-xylene | Et. Bz. | Styrene | Total |
| 1. Fresh feed | 210 | 450 | 180 | 160 |  | 1,000 |
| 2. Dehydrogenation effluent | 208 | 440 | 179 | 8 | 145 | 980 |
| 3. Total feed to fract. column (2+8) | 852 | 2,366 | 821 | 8 | 145 | 4,190 |
| 4. Overhead from fract. col | 842 | 2,346 | 12 | 8 |  | 3,208 |
| 5. Bottoms from fract. col | 10 | 20 | 809 |  | 143 | 982 |
| 6. Clathration extract | 690 | 110 |  | 4 |  | 804 |
| 7. Clathration raffinate | 152 | 2,256 | 12 | 4 |  | 2,418 |
| 8. Isomerization effluent | 644 | 1,926 | 642 |  |  | 3,212 |

This example shows the production of 86% pure p-xylene, at a recovery per clathration stage of 82%, and an ultimate p-xylene yield of 82%, based on the total non-ethylbenzene components of the feed mixture. By adding another clathration stage, the above clathration extract may be further purified to obtain 97+% pure p-xylene.

EXAMPLE II

In this example, the clathration efficiency for mixtures containing varying proportions of ethylbenzene is compared. The complex employed is nickel-tetra (gamma picoline) dithiocyanate, and the conditions of clathration are similar to those described in Example I. The composition of samples is determined by ultra-violet absorption spectranalysis, with the following tabulated results:

Table 2

|  | Normal Hydroformer C-8 fraction | Ethylbenzene free |
| --- | --- | --- |
| Composition of Feed, volume percent: |  |  |
| o-xylene | 18.4 | 18.4 |
| m-xylene | 46.2 | 52.3 |
| p-xylene | 19.4 | 29.1 |
| Ethylbenzene | 16.0 | 0.2 |
| Wt. ratio, complex/p-xylene | 10.9 | 8.3 |
| Wt. ratio of excess gamma-picoline to complex | 0.2 | 0.2 |
| Wt. ratio of complex to kerosene thinner | 0.6 | 0.6 |
| Contact time, hours | 1.5 | 1.5 |
| Product: |  |  |
| Purity of p-xylene, Vol. percent | 71.6 | 90.4 |
| Recovery of p-xylene, Vol. percent | 68.5 | 68.6 |
| Efficiency (moles of clathrated p-xylene per mole of complex) | 0.33 | 0.43 |

From the above data it is clear that the efficiency of the clathrating mechanism for removing p-xylene from hydroformer C-8 hydrocarbon mixtures is improved by about 25% when the feed mixture is free from ethylbenzene. When the o-xylene is also removed there is a further slight increase in efficiency, but the principal advantage in removing o-xylene, insofar as the clathration step is concerned, lies in the reduced solvent or thinner requirements.

While the above examples are limited to the use of one particular Werner complex, the other complexes heretofore described are found to give substantially similar results. Likewise, varying the process conditions results only in consistent differences in degree of recovery, purity, etc. as will be understood by those skilled in the art. The foregoing disclosure is therefore not to be considered as limiting, since many variations may be made by those skilled in the art without departing from the scope or spirit of the following claims.

We claim:

1. A process for recovering p-xylene from a feed mixture comprising substantial proportions of p-xylene, m-xylene, and o-xylene and between about 5% and 30% of ethylbenzene, which comprises subjecting said feed mixture to dehydrogenation at a temperature between about 575° and 700° C. in the presence of a dehydrogenation catalyst to convert substantially all of said ethylbenzene to styrene, subjecting the dehydrogenation effluent to fractional distillation to obtain a bottoms fraction consisting of o-xylene, and styrene and an overhead fraction consisting essentially of m- and p-xylene, contacting said overhead fraction with a Werner complex consisting essentially of a tetra(4-lower alkyl pyridino) metal thiocyanate, said metal having an atomic number of 25 to 28 inclusive, thereby forming a solid clathrate containing an extract phase relatively enriched in p-xylene, separating said clathrate from the m-xylene-rich raffinate and recovering p-xylene from said clathrate, said contacting with Werner complex being effected under conditions which would, without prior removal of ethylbenzene from said feed, produce a clathrate containing both p-xylene and ethylbenzene.

2. A process as defined in claim 1 wherein o-xylene is separated from said bottoms fraction and is subjected to isomerization in the presence of an isomerization catalyst to convert a substantial portion thereof to m- and p-xylene, and the resulting isomerizate is recycled to said fractional distillation step, thereby building up the ratio of o-xylene to styrene in said bottoms and inhibiting polymerization.

3. A process as defined in claim 1 wherein m-xylene from said clathration raffinate is subjected to isomerization in the presence of an isomerization catalyst to convert a substantial portion thereof to o- and p-xylene, and the resulting isomerizate is recycled to said fractional distillation step, thereby building up the ratio of o-xylene to styrene in said bottoms and inhibiting polymerization.

4. A process for producing substantially only p-xylene and styrene from a feed mixture comprising substantial proportions of p-xylene, m-xylene, and o-xylene and between about 5% and 30% of ethylbenzene, which comprises subjecting said feed mixture to dehydrogenation at a temperature between about 575° and 700° C. in the presence of a dehydrogenation catalyst to convert substantially all of said ethylbenzene to styrene, subjecting the dehydrogenation effluent to fractional distillation to obtain a bottoms fraction consisting essentially of o-xylene and styrene and an overhead fraction consisting essentially of m-xylene and p-xylene, separating styrene from o-xylene in said bottoms fraction, contacting said overhead fraction with a Werner complex consisting essentially of a tetra(4-lower alkyl pyridino) metal thiocyanate, said metal having an atomic number of 25 to 28 inclusive, thereby forming a solid clathrate containing an extract phase relatively enriched in p-xylene, separating said clathrate from the m-xylene-rich raffinate and recovering p-xylene from said clathrate, subjecting said m-xylene-rich raffinate and said o-xylene separated from said bottoms fraction to isomerization in the presence of an isomerization catalyst to produce an ethylbenzene-free isomerizate containing a substantial proportion of p-xylene, and recycling said isomerizate to said fractional distillation step, said contacting with Werner complex being effected under conditions which would, without prior removal of ethylbenzene from said feed, produce a clathrate containing both p-xylene and ethylbenzene.

5. A process according to claim 4 wherein said feed mixture contains between about 15% and 25% p-xylene, 40% and 60% m-xylene, 15% and 25% o-xylene, and 10% and 20% of ethylbenzene.

6. A process as defined in claim 1 wherein the alkyl pyridine of said Werner complex is selected from the group consisting of 4-methyl pyridine and 4-ethyl pyridine.

References Cited in the file of this patent

UNITED STATES PATENTS

| | | |
|---|---|---|
| 2,656,397 | Holzman et al. | Oct. 20, 1953 |
| 2,798,891 | Schaeffer | July 9, 1957 |

OTHER REFERENCES

Jour. Chem. Soc. (London), 1948, pp. 61–73, article by Powell.

Nature, vol. 163, pp. 566–7 (1949), article by Powell et al.

Jour. Chem. Phys., vol. 18 (1950), pp. 750–1, article by Smith.

Jour. Chem. Soc. (London) (1950), p. 3346, article by Evans et al.

Chemical Abstracts, vol. 45, p. $3245^{a-1}$ (1951), original article by Bughulin et al.

Jour. Chem. Soc. (London), 1952, pp. 319–28, article by Rayner et al.